Aug. 8, 1961 S. FREEMAN 2,995,619

SYSTEM OF TELEVISION TRANSMISSION AND PHOTOGRAPHIC REPRODUCTION OF THE TELEVISED IMAGE

Filed June 3, 1958 3 Sheets-Sheet 1

INVENTOR
Samuel Freeman

Aug. 8, 1961 S. FREEMAN 2,995,619

SYSTEM OF TELEVISION TRANSMISSION AND PHOTOGRAPHIC REPRODUCTION OF THE TELEVISED IMAGE

Filed June 3, 1958 3 Sheets-Sheet 2

INVENTOR
Samuel Freeman

Aug. 8, 1961
S. FREEMAN
2,995,619
SYSTEM OF TELEVISION TRANSMISSION AND PHOTOGRAPHIC REPRODUCTION OF THE TELEVISED IMAGE
Filed June 3, 1958
3 Sheets-Sheet 3

INVENTOR
Samuel Freeman 2,995,619
Patented Aug. 8, 1961

2,995,619

SYSTEM OF TELEVISION TRANSMISSION AND PHOTOGRAPHIC REPRODUCTION OF THE TELEVISED IMAGE

Samuel Freeman, 31—39 89th St., Jackson Heights, New York, N.Y.

Filed June 3, 1958, Ser. No. 739,498
7 Claims. (Cl. 178—5.2)

This invention relates to the photographic reproduction of full-color or monochromatic still pictures as displayed on the face of a cathode ray tube in terms of ultra violet light. It combines the arts of television and photography by making use of the fact that phosphors may be stimulated by the electron beam of a cathode ray tube to emit invisible light in the ultra violet region, and the availability of photographic printing papers and transparent foils which are sensitive mainly to light frequencies in that region.

In its broadest aspect, the object of the inventive system is to provide a simplified daylight means for the reproduction in permanent form of "still" intelligence that may be displayed on the face of a cathode ray tube. With regard to commercial, open-circuit television transmissions, this invention anticipates the required compatibility with the composition of the conventional black and white television signal and the FCC-adopted NTSC color television standards. This invention is not concerned directly with the basic methods used to achieve correct color selection for each picture element scanned in the studio or reproduced by conventional color television receivers.

In an open-circuit transmission, compatible with the NTSC color television standards, one object of this invention, when a color "still" is being transmitted, is to enable the received scene to be photographically reproduced by a daylight process.

In an open-circuit transmission, compatible with the NTSC color television standards, when an aminated color scene may be transmitted, another purpose of this invention is to enable an operator of a receiver to electronically "snap" a "still" of all color aspects of the received scene and to photographically print the scene in natural color by a daylight process.

In a closed-circuit transmission, utilizing the CBS-type color-wheel system of color television, when a color "still" is being transmitted, another object of this invention is to enable daylight photographic reproduction of the received scene.

In a closed-circuit transmission, utilizing the CBS-type color-wheel system of color television, when an animated scene may be transmitted, still another purpose of this invention is to enable an operator of a receiver to electronically "snap" a "still" of all color aspects of the received scene and by a daylight process to photographically print the scene in natural color.

In a closed circuit transmission, utilizing a flying-spot scanner source of video signals representative of color separations, when the color separations of a color photograph or transparency are being transmitted, another object of this invention is to enable daylight photographic reproduction of the received separations in natural color.

Still another object of the invention is to print black-and-white color-separation foils of each color aspect transmitted in the above systems.

The invisible emission spectrum of ultra violet is from 4000 to 1600 Angstrom units. P16 phosphors as specified by RCA, and other phosphors, emit ultra violet substantially within this invisible region. The P16 phosphors, for example, has outside limits of 3200 and 4000 Angstrom units, and a peak between at 3700.

The photographic materials proposed for use in this invention are known as diazo materials; they have maximum sensitivity in the ultra-violet region between 3600 and 4000 Angstrom units. Materials in the form of transparent foils are available which develop the three subtractive primary colors magenta, cyan and yellow by exposure to ammonia fumes.

This invention proposes the separate translation within a television receiver of the received video signal information of each of the additive primary colors (red, green, blue) into images on the screen of a cathode-ray tube in terms of ultra violet emission. Respective subtractive-color diazo foils cyan, magenta and yellow are exposed to the ultra-violet images representing the red, green and blue color separations.

It proposes that the ultra violet-emitting cathode-ray tube have a uniform phosphor screen, conveniently-deposited or formed by evaporation techniques for high resolution, as the system may demand. The screen may be aluminized or unaluminized.

The particular object and feature of this invention, and other objects and features ancillary thereto, will be more clearly understood from a reading of the following description in conjunction with the accompanying drawings, showing, by way of example, preferred embodiments of the inventive idea.

As stated, this invention relates to the photographic reproduction of full-color or monochromatic pictures as displayed in terms of invisible ultra violet on the face of a cathode-ray tube. It is intended that exposure of the diazo-sensitized materials to the ultra-violet image be made through an appropriate lens system in close proximity to the tube face. Since it is impractical to expose the slow-printing, diazo-sensitized materials to animated light images through a mechanical shutter, it is necessary that the ultraviolet-emitting cathode ray tube display a still picture for the required exposure time. Half-tone picture storage tubes are used to "snap" the color separations of the animated scene.

It is appropriate, therefore, to describe the types and general operation of picture storage tubes applicable in principle to the inventive systems. Some examples of such storage tubes are the Graphechon, the Radechron, the Haeff memory tube, and the Recording Tube. This latter tube is the subject of a brochure entitled, "Performance Characteristics of The Recording Tube," by R. C. Hergenrother and A. S. Luftman, of the Raytheon Manufacturing Company, Waltham, Mass.; Reprinted from the Proceedings of the National Electronic Conference, vol. 8, January, 1953.

Figures 1, 2, 3:
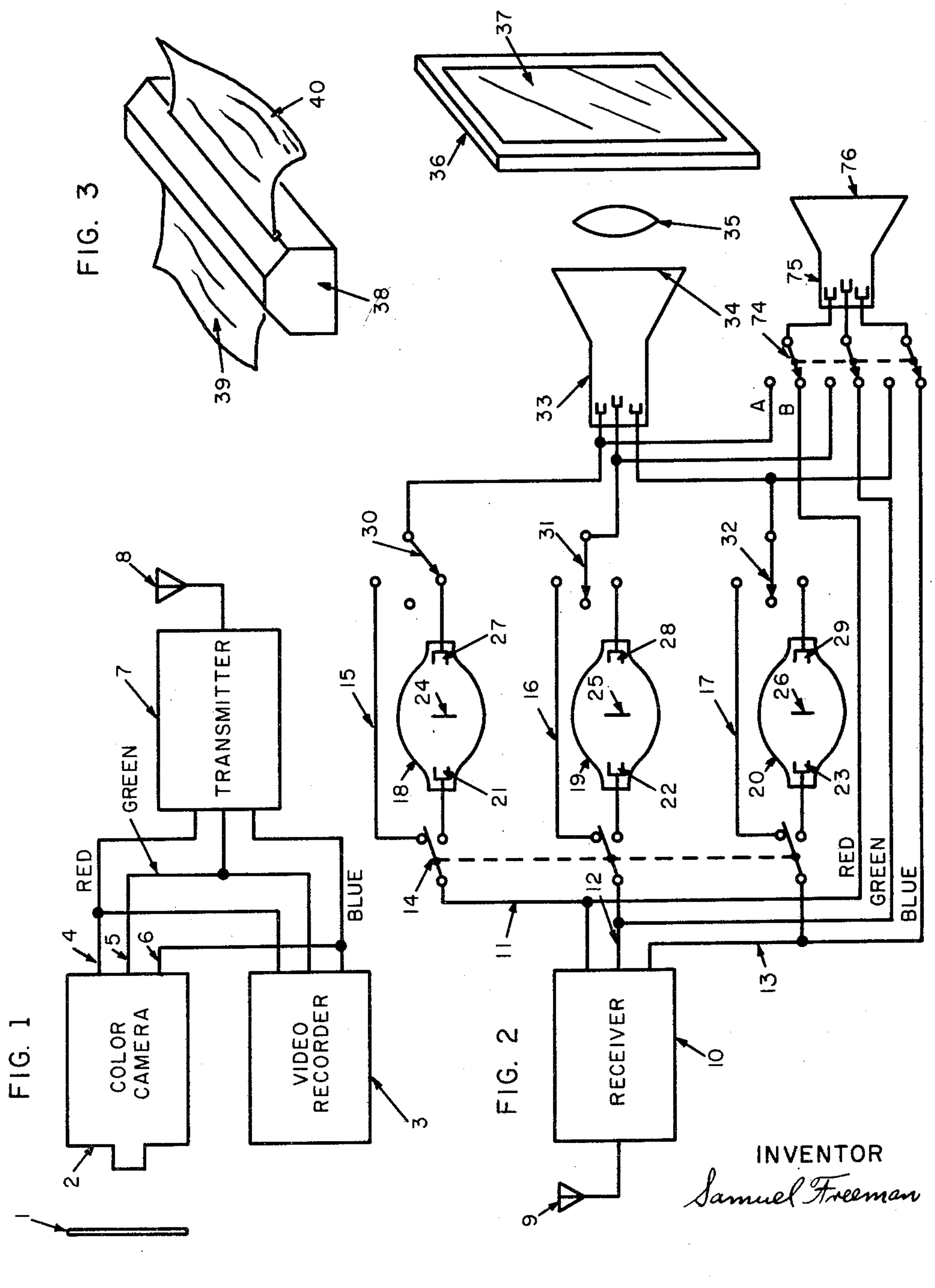
FIGURE 1 is a block diagram of the transmitting portion of the proposed open-circuit system.
FIGURE 2 is a representation of the receiving portion of the proposed open-circuit system.
FIGURE 3 is a representation of a "dry" development tank to develop the exposed sensitized materials.
Figure 4:
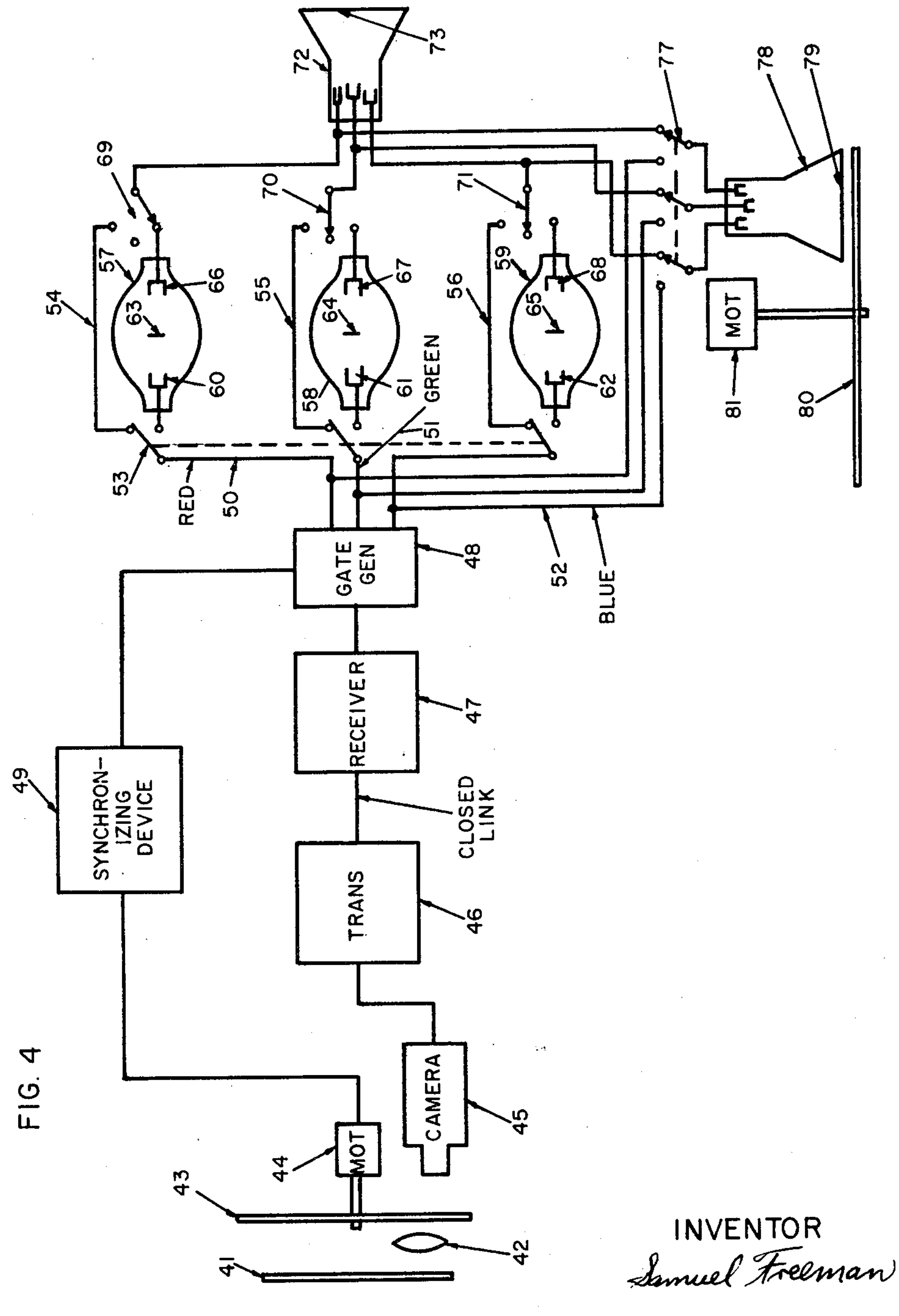
FIGURE 4 is a block diagram of the proposed closed-circuit system.

Although a two-gun picture-storage tube capable of permitting simultaneous or separate writing and reading is shown in FIGURES 2 and 4, the use of a single-gun tube is not precluded. In this case, the single gun would be used both to write the picture information on the storage surface or target, and to read the information therefrom.

The operation of picture storage tubes requires, in general, four operating conditions: (1) Read; (2) Erase; (3) Prime; (4) Write. During the "Read" the stored signal is picked off the signal electrode or target. To prepare the tube to store new information, the previously stored signals are first erased by writing a D.C. signal into the tube. After erasure, but before writing a new signal to be stored, the target storage surface is uniformly charged or "Primed."

With reference to FIGURE 1, in the conventional NTSC standard type of transmission of an animated or still colored picture 1, briefly, the primary color video information is analyzed by the studio camera 2, then sampled and combined to make a composite video color signal, and subsequently used to modulate the transmitter 7. The analysis of the color components of the studio scene for the purpose of transmission by the NTSC standards may be made by a color camera having three camera tubes. In FIGURE 1, color camera 2 represents such a camera. By the use of selective filters or dichroic mirrors, each camera tube within the camera is made sensitive to one of the three primaries. The color camera separates the scene into its red, blue, and green components. Its output is three voltages appearing on lines 4, 5 and 6, one of which corresponds to the amount of red in the element of the scene being scanned at each instant, another to the amount of blue, and the third to the amount of green. These voltages are supplied to the transmitter 7, which produces the standard NTSC signal for propagation by antenna 8.

It is clear in FIGURE 1 that video recorder 3 may be used also in place of camera 2 as a source of three voltages representative of the color aspects of a recorded scene, or the image of the recorder may be superimposed upon that from the camera.

FIGURE 2 represents the receiving portion of the proposed open-circuit system. It is first assumed that an NTSC color signal of an inanimate scene 1 is received by antenna 9 and processed by color receiver 10. The video output voltages on lines 11, 12, 13 represent the red, green and blue components, respectively, of scene 1.

If ganged-switch 14 is in position as shown in FIGURE 2 and switches 30, 31 and 32 were clockwise, connected to lines 15, 16 and 17, respectively, then all three video output voltages would modulate the beam(s) of cathode ray tube 33. Because the phosphor screen 34 of tube 33 emits ultra violet upon excitation, a modulated ultra-violet image representing the entire inanimate scene 1 would be projected through lens system 35 onto diazo-sensitized foil 37 held in frame 36. After a determined exposure time, diazo foil 37 is removed from frame 36 and processed through developing tank 38 in which the foil is developed by ammonia fumes as in conventional whiteprint development. The developed foil is a monochromatic picture of scene 1.

If it is desired to print a full-color picture of an inanimate scene 1, the open-circuit system would operate as follows:

The NTSC color signal of inanimate scene 1 would be transmitted and received, as explained, and the color separations would appear on lines 15, 16 and 17 of FIGURE 2. In this instance, using only one ultraviolet projection tube, it is necessary to print each color separation separately. Therefore, switch 30 would be closed to line 15; switches 31 and 32 would be turned to their center off positions. The electron beam of cathode ray tube 33 is then modulated by the video signal representative of the red component of scene 1. Projected through lens system 35, the ultra violet light emitted by phosphor 34 would expose diazo foil 37 in frame 36. After the determined exposure time, the foil is passed through the ammonia fumes generated in development tank 38. Referring to FIGURE 3, the number 39 represents the undeveloped portion of exposed foil 37; the number 40, the developed portion of the foil. In this instance, the developed portion is cyan in color.

To make the magenta and yellow foils to complete the full-color transparency, the above process is repeated with the proper diazo-sensitized foil 37 in frame 36 and switches 30, 31 and 32 in correct position. The foil 37 which develops magenta is placed in frame 36 when switch 31 is connected to line 16 and switches 30 and 32 are in their center off positions. The foil 37 which develops yellow is placed in frame 36 when switch 32 is connected to line 17 and switches 30 and 31 are in their center off positions. When all three properly-exposed and developed foils are placed in register, a full-color transparency results.

In order to electronically "stop" a received animated picture 1, this invention proposes the use of three picture storage tubes (one for each primary additive color). To "stop" the picture, each storage tube is activated simultaneously by ganged-switch 14 to sample the video channels 11, 12 and 13 for a required number of frames. Sampling occurs when the three sections of switch 14 are momentarily connected to writing guns 21, 22 and 23. The color information sampled is written as electrostatic images on the targets 24, 25 and 26, after which, as desired, each primary color target image (red, for example) in turn is read repeatedly by reading gun 27, 28 or 29, to modulate the ultra-violet emitting cathode-ray tube 33. During this repeated reading time, the video color signal modulating the cathode-ray tube 33 would be of a partial still picture containing only the red components of the studio scene 1 scanned. In this instance, switch 30 is counterclockwise, connected to reading gun 27 of picture storage tube 18; switches 31 and 32 are in their center off positions. After a determined exposure time, repeated readings of the blue target image would be made; then the green. In this manner, by operating switches 30, 31 and 32, the operator of the receiver could optically-project whole primary color frames for a determined time, thereby controlling the time of exposure of the respective sensitized diazo foils.

It is understood, of course, that, in this instance, the horizontal and vertical sweep frequencies applied to the storage tubes are the standard 15,750 and 60 c.p.s., respectively. Switch 14 is activated long enough (1/30 second) so that at least one complete color separation frame is written on each storage tube.

Preferably the system of FIGURE 2 is provided with monitor means, which can be as follows:

At the output of the receiver 10 of FIGURE 2, use may be made of a cathode-ray tube 75 with a tricolor phosphor (P22) screen 76 in order to continuously monitor the received intelligence (so shown in FIGURE 2). This type of tube might be employed also, connected to lines 30, 31 and 32, to monitor the "still" being printed. Switch 74, operated to the B or A position, accomplishes this dual function of cathode ray tube 76.

In both FIGURES 2 and 4, a trio of picture storage tubes is illustrated. The applicant, however, is mindful of Weimer Patent No. 2,674,704, Storage Tube for Color Television Signals, Etc. This single tube is considered applicable in principle to the inventive system; its use would replace the trio of picture storage tubes described.

There are two recognized methods of camera pickup: the first is represented by the color camera in FIGURE 1; the second, the color-wheel CBS-type in FIGURE 4. Both systems of camera pickup are described in chapter 9 of Television Engineering by Donald Fink. The CBS system makes use of a color wheel 41 in front of the camera 45 and contains one pickup tube. The camera in this method has an output of color frames and is considered a field sequential method of scanning the primary additive colors.

Though the NTSC standards have been approved by the FCC for open-circuit transmission, color analysis by the CBS color-wheel system remains simpler than that achieved by dichroic mirrors. The CBS color-wheel analysis method, therefore is best suited to closed circuit television.

The applicant, therefore, conceives that the principles of displaying color frames in terms of ultra-violet on a cathode-ray tube for the purpose of exposing diazo-sensitized materials, are wholly compatible to such a closed television system.

Reference is made to FIGURE 4: it is assumed that scene 41 is inanimate. So that a complete color-separation frame might be displayed in not more than 1/30 of a second, the closed system would utilize a motor 44 to rotate a red-green-blue segmented color wheel 43 and a camera 45 to provide sweep speeds of 180 fields and 525 lines. This represents 60 red, 60 green and 60 blue fields per second, and 47,250 scanning lines per second; in other words, three times the standard vertical and horizontal sweep rates of 60 and 15,750 c.p.s,. respectively. These sequential fields appear at the output of camera 45 and are red, green and blue; they are fed to transmitter 46.

From transmitter 46, the video signals of the color fields are carried over the closed link to receiver 47 where they are processed and forwarded to gate generator 48. Gate generator 48, acting like a distributor, is synchronized by a synchronizing device 49 to motor 44 and therefore to the speed of rotation of segmented color wheel 43. Synchronized in this manner, gate generator 48 functions to distribute the video signals representing each of the color-separation fields to respective output lines 50, 51 and 52 (i.e., video signals of the red field appear on line 50 when the red filter segment of color wheel 43 is in front of camera 45; signals of the green field appear on line 51 when the green segment is in front of the camera; signals of the blue field appear on line 52 when the blue segment is in front of the camera). With switch 53 in position as shown in FIGURE 4, the color-separation fields, therefore, appear on lines 54 (red), 55 (green) and 56 (blue). By manipulation of switches 69, 70 and 71, in the manner of switches 30, 31 and 32, it is possible to optically-project from cathode-ray tube 72 with ultraviolet-emitting phosphor 73 the ultraviolet image of each color-separation field onto respective diazo-sensitized foils.

When scene 41 may be animated, the video signals representing each color separation field are transmitted through the system shown in FIGURE 4 to gate generator 48. Gate generator 48, as explained, distributes the color separation fields, red on line 50, green on 51, and blue on 52. At this point, in order to electronically "snap" a photograph of all three color separations, ganged-switch 53 is momentarily closed to writing guns 60, 61 and 62 of picture storage tubes 57, 58 and 59. The red, green and blue fields appearing on lines 50, 51 and 52, respectively, are written and stored as electrostatic images on targets 63, 64 and 65. In order to read the red field only into cathode-ray tube 72, switch 69 is closed to reading gun 66 and switches 70 and 71 are in their center off position.

The image on target 63 is read repeatedly for a determined duration to properly expose the respective diazo foil to the ultra-violet light emitted by phosphor screen 73 of cathode ray tube 72. In a similar manner, each stored color separation field is used to modulate the electron beam of cathode-ray tube 72 and to excite phosphor screen 73 to emit an ultraviolet image representative of the particular color separation. When all three, properly-exposed and developed foils are placed in register, a natural-color transparency results.

Preferably the system of FIGURE 4 is provided with monitor means, which can be as follows:

At the output of the gate generator 48 of FIGURE 4, use may be made of cathode-ray tube 78 and white-light emitting screen 79 with a color-analysing wheel 80 rotated by synchronized motor 81 in order to continuously monitor the received intelligence. This type of tube might be employed also, connected to lines 69, 70 and 71, to monitor the "still" being printed. Switch 77 in FIGURE 4 enables one such cathode-ray tube with color-analysing wheel to monitor either place in the system.

With regard to FIGURE 4, in order for proper storage on targets 63, 64 and 65, of course, the vertical and horizontal sweep rates applied to the writing beam of each storage tube are 180 and 47,250 c.p.s., respectively. "Reading" of the stored color frames would be at the vertical and horizontal sweep rates of 60 and 15,750 c.p.s., respectively. In this closed-circuit system of color television, since the writing and reading rates within the storage tubes are different (writing rate three times the reading), it is considered most practical that each storage tube contain two electron guns, one for writing and one for reading, as shown in FIGURES 2 and 4.

With regard to phosphor screen 73 of cathode-ray tube 72, it is appropriate to recognize at this point that the terms "long-wave ultra violet," "near ultra violet," "black light," used in literature are synonymous to denote that part of the electromagnetic spectrum just below the visible region, having a wavelength of approximately 3200 to 4000 Angstrom units.

The use of an ultraviolet emission image on the face of cathode-ray tube is not unknown in the art. A portion of the ultraviolet spectrum is emitted by the Flying-Spot Cathode-ray tube 5ZP16 manufactured by the Radio Corporation of America. The tube is used in a flying spot video-signal generator. The ultraviolet spot provides a small, rapidly moving source of invisible energy. This energy is projected through a subject slide transparency, motion picture film, etc., onto a multiplier tube. This latter converts the radiation transmitted or reflected by the subject into a video signal.

The open-circuit systems embracing the inventive idea and illustrated by FIGURES 1 and 2, heretofore described, as said, are compatible with the FCC-adopted NTSC color television standards. The closed-circuit systems as illustrated by FIGURE 4 conforms to practical, commercial standards for transmission of color television images. Yet another variation of the inventive idea, actually a closed-circuit system, is illustrated by FIGURE 5.

Figure 5:
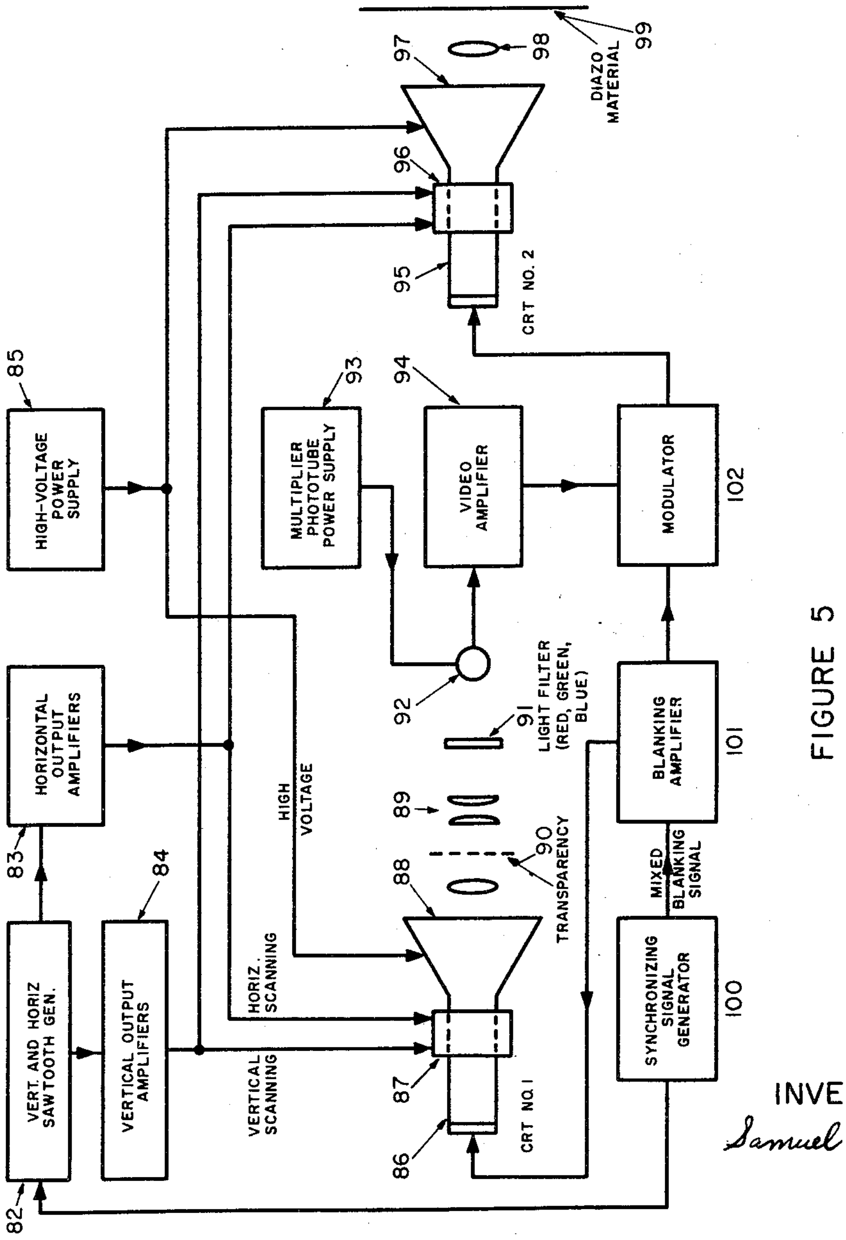
FIGURE 5 is a block diagram of a closed-circuit system, utilizing a flying-spot scanner.

FIGURE 5 indicates the use of two cathode-ray tubes 86 and 95. Cathode-ray tube 86 contains phosphor screen 88 which emits white light when impinged by the electron beam; cathode-ray tube 95 contains phosphor screen 97 which emits ultra-violet light when impinged by the electron beam. Preferably, both cathode-ray tubes are high resolution types in design of electron optics and phosphor screen. (CBS-Hytron, at the March, 1958, IRE Convention in New York announced the pilot-production of such a cathode-ray tube, using a phosphor screen deposited by NRL-developed evaporation techniques and having a resolution of 6000 lines.)

With reference to FIGURE 5, synchronizing generator 100 serves as a primary means to synchronize the vertical and horizontal sawtooth generators 82, whose outputs are amplified by vertical amplifier 84 and horizontal amplifier 83, respectively. The output of vertical output amplifier 84 provides vertical scanning voltage to both deflection yokes 87 and 96 of cathode-ray tubes 86 and 95; the output of horizontal output amplifier 83, provides horizontal scanning voltage to both deflection yokes 87 and 96 of the cathode-ray tubes. Synchronizing generator 100 also supplies synchronizing and blanking signals through blanking amplifier 101 to both cathode-ray tubes. High voltage is supplied to both cathode-ray tubes 86 and 95 by high voltage supply 85.

In operation, color transparency 90 is placed in line with lens system 89 before the phosphor screen 88. A light filter 91 (red, green or blue) is placed, as indicated in front of phototube 92, supplied with power by multiplier phototube power supply 93.

As the unmodulated white light emitted by phosphor screen 88 is projected by lens system 89, it is modulated by color transparency 90. Light filter 91 (red, for example) serves to allow only the red component of light which was transmitted by color transparency 90 to fall on phototube 92. Multiplier phototube 92, in this instance, "sees" only the red component of the transparency, and its resultant video output voltage, therefore, is representative of that component of light. The video output of phototube 92 is amplified by video amplifier 94, after which the video signal is modulated in modulator 102 by the synchronizing and blanking signals from blanking amplifier 101. The output of modulator 102 is applied to cathode-ray tube 95 in order to modulate its electron beam. In this manner, the modulated electron beam of cathode-ray tube 95 traces on phosphor screen 97 an image representative of the red component of transparency 90. Since phosphor screen 97 emits ultra-violet, the resulting ultra-violet image representative of the red component may be projected through lens system 98 to expose the proper diazo material 99, in this instance, the foil which develops cyan.

In like manner, light filter 91 may be green, in which case, the diazo foil 99 which develops magenta would be exposed to the ultra-violet image emitted by phosphor screen 97. With a yellow light filter 91, the diazo foil 99 which develops yellow would be exposed to the ultra-violet image emitted by phosphor screen 97.

It is recognized here that certain glass absorbs ultra-violet light and so does not transmit those frequencies. It is proposed that the faceplates of cathode-ray tubes and lens systems intended to make use of the principles of this invention be made of glass which will transmit ultra-violet light freely.

This invention proposes the use of "dry-development" of sensitized diazo transparent foils and printing papers—similar to those used in the commercial Ozalid process. These materials are sensitive primarily to ultra-violet light of substantially the same portion of the frequency spectrum as that emitted, for example, by a P16 phosphor, and therefore may be handled in reasonable ambient light containing a minimum of ultra violet. The preferred system, therefore, makes use of a "daylight" method of developing the sensitized materials. Papers and transparencies are available which, when dry-developed, for example, in ammonia vapors, turn the three subtractive primary colors. Those areas of the sensitized sheet which have been exposed to ultra violet become desensitized in proportion to the intensity of exposure; unexposed areas when developed turn the subtractive color intended.

It is important to recall that this invention proposes the translation of the signal information of each of the additive primary colors. These additive primary colors are red, green, and blue. When these three primaries in the form of light are combined additively in appropriate amounts, white light is produced. If the three primaries are added in unequal proportions, the white is tinted by the color of the predominant primary.

This additive system applies to light; it does not apply to color photography. Therefore it remains to explain the translation of the ultra-violet picture images of each additive primary color to one of the subtractive primary colors (magenta, cyan and yellow) used in color photography to produce full-color pictures.

The proposed system is illustrated by explaining how the red area of a studio picture being scanned may be reproduced on a transparency or print. At the receiver, the red information signal produces an ultra-violet image on the face of the cathode-ray tube, at which time a sensitized transparency is exposed. As a result of exposure to ultra-violet, those certain areas of the transparency become desensitized, and upon development remain transparent. The unexposed area upon development turns a cyan (bluish-green) color. When white light is directed on cyan, red light is absorbed. Therefore, when all three subtractive primary transparencies are superimposed, this area will not contain red.

The complete full-color transparency is produced by the development and superposition of the following three subtractive color transparencies: (1) The tranparency which develops cyan when exposed to the ultra-violet image of the red signal; (2) The transparency which develops magenta after exposure to the ultra-violet image of the green signal; (3) The transparency which develops yellow after exposure to the ultra-violet image of the blue signal.

Thus, in the illustration above, the areas on the second and third transparencies which correspond to the red signal area of the first transparency, will be magenta and yellow, respectively. It remains to state that the magenta transparency will absorb green light from white light; the yellow will absorb blue light from white. The remaining unabsorbed spectrum will be red—corresponding to the original red area. By a similar process all visible colors of the spectrum can be reproduced.

Each sensitized transparency may be placed by hand in front of the cathode-ray tube for proper exposure. However, this invention proposes use of a frame of special design to be placed in front of the cathode-ray tube in order to expeditiously change the transparencies, in the determined sequence, after exposure to each color signal. It is proposed that the frame contain a continuous roll of "film," but that the areas of the transparency or paper roll be sensitized successively in the determined standard sequence of exposure. After making the three or four required exposures for a full-color picture, the transparency may be torn from the frame and passed through the "dry-development" tank, which may be either an integral though separate section of the frame, or an entirely separate instrument.

With respect to the use of the Ozachrome materials in the preferred system, the following is quoted from the book, A Half Century of Color, by Louis Walton Sipley, Director of American Museum of Photography, published by The Macmillan Company, 1951, page 207:

"Another product which has come to the fore in the last few years is that known as Ozachrome. This is a light-sensitive dye (diazo) product of the Ozalid division of General Aniline and Film Corporation. The purpose behind the commercial production of Ozachrome is to provide a color-proofing material which can be used in the graphic arts. Under 'The Camera and the Press,' reference was made to this material as being usable for proofing the separation positives used in both lithography and gravure. The Ozachrome sheets are of transparent acetate and are processed by dry development. Four colors are used for proofing, red, yellow, blue and black. These four transparent color images are combined by superimposition to provide a full-color picture which, if the separations have been properly made, will match the original. It can be used for proofing of photoengraving separations where the indirect process is used and continuous-tone separation positives are available. Positives are needed to print on this diazo material."

In the operation of the systems, it is considered entirely feasible that color balance and correct exposure of each transparency to the ultra-violet separation positives may be achieved by adjustment of color controls on the television receiver.

While the systems of the present invention are capable of reproducing natural color transparencies, it is not to be inferred that the invention is limited in its application to such use. Thus, it is believed apparent, that the systems herein described can, with equal facility, be used to reproduce on the diazo materials trains of "black and white" television signals, radar, teleran or facsimile signals.

Furthermore, the systems described need not be operated to make natural color transparencies directly, but rather intermediate black- and white color separation positives first may be made. In this instance, instead of exposing the subtractive primary diazo foils to the respective ultra-violet image, a diazo foil which develops black may be used for each exposure. Development of each foil will yield black-and-white positive color separations. These, in turn, may be used to print on the respective subtractive primary foils to obtain a proof of the separations. Small black-and-white color separations may be projected for enlargement by an ultra-violet projector onto the respective color foils or onto printing plates. It will be realized that such techniques and variations thereof will simplify greatly the making of color-proved printing plates used in the graphic arts.

Although switches of a mechanical nature are shown and described herein, it is to be understood that electronic switching means could as well be employed for accomplishing the same purpose. Mechanical switching arrangements have merely been shown in order to simplify the drawings and explanations thereof and in order to present readily a complete and understandable description of the system.

For example, the switches 30, 31 and 32, and switches 69, 70 and 71 are shown to indicate how each color-separation video signal is impressed on the ultra-violet emitting cathode-ray tube. Well-known in the electronic art, however, are the means to mix several input signals. Thus, the basic systems may include mixing networks in place of the switches in order to blend two or more color separation video signals for the purpose of color control.

Furthermore, it is to be understood that various types of television camera tubes may be used, and that it is not necessary to use the particular form of electron storage tube specifically indicated in the drawings. Various types of storage tubes may be used, the one shown in the figures being merely representative of tubes that could be employed.

The systems described have assumed for simplicity the use of one camera or equivalent, such as the flying-spot scanner, as a source of the color-separation video signals; the parallel use of two or more signal sources is not precluded. It becomes apparent, therefore, with the use of two or more signal sources, that the task of photocomposition in color becomes vastly simplified. The use of all the techniques of commercial television, such as background projection, superimposition, etc., would provide a flexibility of composing advertisements in color—color-proved—in infinite variety never before achieved.

Various other alterations and modifications of the present invention may become apparent to those skilled in the art, and it is desirable that any and all such modifications and alterations be considered within the purview of the present invention except as limited by the hereinafter appended claims.

I claim:

1. An open-circuit system of television transmission and photographic reproduction of the televised image, comprising: an inanimate object, a color television camera to produce video signals representative of the additive primary color aspects of the object, transmitter means to radiate said signals, receiver means to process the signals of the object, switching means to direct independently the video signal of each aspect to modulate the electron-beam of a cathode-ray tube, means including a cathode ray tube with an ultra-violet emitting phosphor screen to translate the signals of each color aspect into a proportionate emission image of ultra-violet, means to expose ultra-violet sensitive materials to said emission, and optical means to project said ultra-violet images to said ultra-violet sensitive materials.

2. An open-circuit system of television transmission and photographic reproduction of the televised image, comprising: a video recorder source of repetitive video signals representative of the additive primary color aspects of an inanimate image, transmitter means to radiate said signals, receiver means to process the signals of the image, switching means to direct independently the video signal of each aspect to modulate the electron-beam of a cathode-ray tube with an ultra-violet emitting phosphor screen to translate the signal of each color aspect into a proportionate emission image of ultra-violet, means to expose ultra-violet sensitive materials to said emission, and optical means to project said ultra-violet images to said ultra-violet sensitive materials.

3. An open-circuit system of television transmission and photographic reproduction of the televised image, comprising: an animate object, a color television camera to produce video signals representative of the additive primary color aspects of the object, transmitter means to radiate said signals, receiver means to process the signals of the object, switching means to simultaneously direct a frame sampling of the signals of each color aspect to modulate respective writing beams of a plurality of picture storage tubes, target means within said tubes to simultaneously store the written electrostatic image of each color aspect, switching means to read out independently each electrostatic image as a video signal of the aspect to modulate the electron beam of a cathode-ray tube, means including a cathode ray tube with an ultra-violet emitting phosphor screen to translate the signal into a proportionate emission image of ultra-violet, means to expose ultra-violet sensitive materials to said emission, and optical means to project said ultra-violet images to said ultra-violet sensitive materials.

4. An open-circuit system of television transmission and photographic reproduction of the televised image, comprising: a video recorder source of video signals representative of the additive primary color aspects of an animate object, transmitter means to radiate said signals, receiver means to process the signals of the object, switching means to simultaneously direct a frame sampling of the signals of each color aspect to modulate respective writing beams of a plurality of picture storage tubes, target means within said tubes to simultaneously store the written electrostatic image of each color aspect, switching means to read out independently each electrostatic image as a video signal of the aspect to modulate the electron beam of a cathode-ray tube, means including a cathode-ray tube with an ultra-violet emitting phosphor screen to translate the signal into a proportionate emission image of ultra-violet, means to expose ultra-violet sensitive materials to said emission, and optical means to project said ultra-violet images to said ultra-violet sensitive materials.

5. A closed-circuit system of television transmission and photographic reproduction of the televised image, comprising: an inanimate object, a color camera employing a color-analysing wheel which produces a sequence of video signals representative of additive primary color fields of the object, transmitter means to transmit said signals over a closed circuit, receiver means to process said signals, a gate generator means to distribute the signals of the additive primary color fields in determined sequence on as many lines as color aspects, said gate generator synchronized by means of a synchronizing device to the rotation of the color-analysing wheel, switching means to direct independently the video signal of each aspect to modulate the electron beam of a cathode-ray tube, means including a cathode-ray tube with an ultra-violet emitting phosphor screen to translate the signal of each color aspect into a proportionate emission image of ultra-violet, means to expose ultra-violet sensitive materials to said emission, and optical means to project said ultra-violet images to said ultra-violet sensitive materials.

6. A closed-circuit system of television transmission and photographic reproduction of the televised image, comprising: an animate object, a color camera employing a color-analysing wheel which reproduces a sequence of video signals representative of additive primary color fields of the object, transmitter means to transmit said signals over a closed circuit, receiver means to process said signals, a gate generator means to distribute or switch the signals of the additive primary color fields in determined sequence on as many lines as color aspects, said gate generator synchronized by means of a synchronizing device to the rotation of the color-analysing wheel, switching means to simultaneously direct a frame sampling of the signals of each color aspect to modulate respective writing beams of a plurality of picture storage tubes, target means to simultaneously store the written electrostatic image of each color aspect, switching means to read out independently each electrostatic image as a video signal of the aspect to modulate the electron beam of a cathode-ray tube, means including a cathode-ray tube with an ultra-violet emitting phosphor screen to translate the signal into a proportionate emission image of ultra-violet, means to expose ultra-violet sensitive materials to said emission, and optical means to project said ultra-violet images to said ultra-violet sensitive materials.

7. A system of color television transmission and photographic reproduction of the televised image, comprising: a cathode-ray scanning tube, means in said tube for generating a focused, unmodulated beam of electrons, screen means in said tube which emits white light when impinged by said beam of electrons, optical means to project said unmodulated "flying-spot" of white light through a color transparency to be reproduced, light-filter means to transmit a color component of said transparency to impinge upon a light-responsive tube, including means for converting the color-separated optical image into a series of television video signals, a video amplifier for increasing the intensity of the produced video signals, means for applying the voltage variations representative of the color-separated optical image to an element of a second cathode-ray tube in order to modulate the current intensity of the scanning cathode-ray beam within said second tube, means within said second cathode-ray tube to translate said modulation of current intensity of the scanning cathode-ray beam into a proportionate emission image of ultra-violet light, means to expose ultra-violet sensitive materials to said emission, optical means to project said ultra-violet images to said ultra-violet sensitive materials, and synchronizing means to produce the horizontal and vertical scanning voltages to deflect the electron beams of said cathode ray tube.

References Cited in the file of this patent

UNITED STATES PATENTS

| | | |
|---|---|---|
| 2,381,901 | Goldsmith | Aug. 14, 1945 |
| 2,406,266 | Sziklai | Aug. 20, 1946 |
| 2,531,031 | De France et al. | Nov. 21, 1950 |
| 2,607,845 | Clark | Aug. 19, 1952 |
| 2,764,629 | Goldmark | Sept. 25, 1956 |
| 2,816,157 | Andreas et al. | Dec. 10, 1957 |